United States Patent [19]
Coates et al.

[11] Patent Number: 5,490,871
[45] Date of Patent: Feb. 13, 1996

[54] GAS SEPARATION

[75] Inventors: John R. Coates, Farnham; Paul W. Kingston, Sheffield, both of England

[73] Assignee: The BOC Group plc, Windlesham Surrey, England

[21] Appl. No.: 189,008

[22] Filed: Jan. 28, 1994

[51] Int. Cl.⁶ .............................................. B01D 53/047
[52] U.S. Cl. .................... 95/23; 95/98; 95/105; 95/130
[58] Field of Search ................ 95/8, 11, 12, 23, 95/98, 100–103, 105, 130; 96/111, 115, 121, 133

[56] References Cited

U.S. PATENT DOCUMENTS

| | | | |
|---|---|---|---|
| 3,775,946 | 12/1973 | Brazzel | 95/105 X |
| 4,197,095 | 4/1980 | White, Jr. et al. | 95/23 X |
| 4,315,759 | 2/1982 | Benkmann | 95/23 |
| 4,440,548 | 4/1984 | Hill | 95/100 |
| 4,472,177 | 9/1984 | Sircar | 95/11 |
| 4,631,073 | 12/1986 | Null et al. | 95/8 X |
| 4,648,888 | 3/1987 | Rowland | 95/8 |
| 4,693,730 | 9/1987 | Miller et al. | 95/8 |
| 4,917,710 | 4/1990 | Haruna et al. | 95/130 X |
| 5,071,453 | 12/1991 | Hradek et al. | 95/8 X |
| 5,207,806 | 5/1993 | Lagree et al. | 95/8 |

Primary Examiner—Robert Spitzer

[57] ABSTRACT

During a purge step of a PSA plant the waste gas being vented is analyzed to identify when a preselected volume of the waste gas contains purge gas after which the purge step is stopped.

3 Claims, 1 Drawing Sheet

GAS SEPARATION

TECHNICAL FIELD

The present invention relates to methods of and apparatus for producing a product gas from a feed gas mixture including the product gas. In particular the present invention relates to a method of and apparatus for producing oxygen from air using pressure swing adsorption (PSA) techniques.

BACKGROUND OF THE INVENTION

It is known to separate oxygen from air using an adsorbent which has the ability to effect a separation as between the two major components of air by virtue of its greater adsorption of nitrogen than of oxygen. Naturally occurring zeolites will selectively adsorb nitrogen and other constituents of air in preference to oxygen. Synthesis of zeolites has greatly enhanced this selectivity enabling oxygen of purities from 93% or better to be produced by PSA techniques.

In operation, a bed of the adsorbent is put through a cycle which includes an adsorption step during which time air is pumped through the bed under pressure and most of the nitrogen and a proportion of the oxygen and substantially all of the carbon dioxide and water vapor in the feed air are adsorbed and an oxygen rich product gas is supplied from the outlet of the bed; and a desorption step during which time the outlet of the bed is closed, the bed is vented to atmospheric pressure usually through its inlet and/or evacuated through its inlet so that the adsorbed gases are substantially removed from the bed thereby preparing it for the next adsorption step.

In practice, it is usual for two adsorbent beds to be employed and operated on similar cycles which are sequenced to be out-of-phase with one another by 180° so that while one bed is on its adsorption step, the other bed is on its desorption step and vice versa. In a simple process having only adsorption and desorption steps the efficiency of the oxygen production is low. Additional steps are usually incorporated to achieve better purities and a more efficient process and one of these additional steps can be a purge step in which product quality gas from the bed undergoing adsorption is diverted to the top of the bed undergoing desorption said oxygen rich gas purging or displacing nitrogen in the desorbing bed.

However, any PSA process that uses a purge step to lower the partial pressure within a bed during regeneration suffers an imbalance from many possible causes such as different quantities or qualities of adsorbents in each bed, different pressures or differing restrictions to each bed. The degree of difficulty in trying to balance the beds is time consuming and will only be correct at the time of adjustment. Variations in ambient atmospheric conditions can deviate the plant operation from its optimum set parameters.

It is an aim of the present invention to so modify a known PSA plant for the production of oxygen that an optimum purge can be used at different production rates regardless of ambient or process conditions such that regeneration can be obtained from each bed at its particular regeneration requirement.

SUMMARY OF THE INVENTION

According to one aspect of the present invention, a method of producing a product gas from a feed gas mixture including the product gas comprises repeatedly performing a cycle of operations which includes the steps of:

a) contacting the feed gas mixture with a bed of adsorbent material which adsorbs preferentially at least one other component of the feed gas mixture relative to the product gas;

b) desorbing the bed;

c) purging the bed with a purge gas;

d) sensing when the gas leaving the bed during the purging step contains a preselected volume of said purge gas; and e) on reaching the preselected volume stopping the purge step.

Preferably, there are a plurality of such beds of adsorbent material each operating on a similar cycle but sequenced to be out-of-phase with one another such that a substantially continuous supply of product gas is produced.

According to a further aspect of the present invention, there is provided an apparatus for the production of a product gas from a feed gas mixture including the product gas by pressure swing adsorption comprising a vessel containing an adsorbent bed, said vessel having a first inlet pipeline at one of its end regions in communicating with a source of the feed gas mixture under pressure, a first outlet pipeline for venting desorbed gases from the bed, and at or adjacent its other end region a second outlet pipeline for said product gas and a second inlet pipeline for a purge gas, each of said pipelines having a valve for controlling the flow of gas therethrough; and means for sensing when the percentage of purge gas in the first outlet pipeline reaches a preselected level, the sensing means transmitting a signal to a control unit which in turn closes the valve associated with the second inlet pipeline thereby preventing the flow of purge gas therethrough.

Preferably the sensing means is a fuel cell located in the first outlet pipeline.

BRIEF DESCRIPTION OF THE DRAWINGS

An embodiment of the invention will now be described by way of example reference being made to the FIGURE of the accompanying diagrammatic drawing which is a schematic diagram of a PSA plant for the separation of oxygen from air.

DETAILED DESCRIPTION OF THE INVENTION

Figure 1:
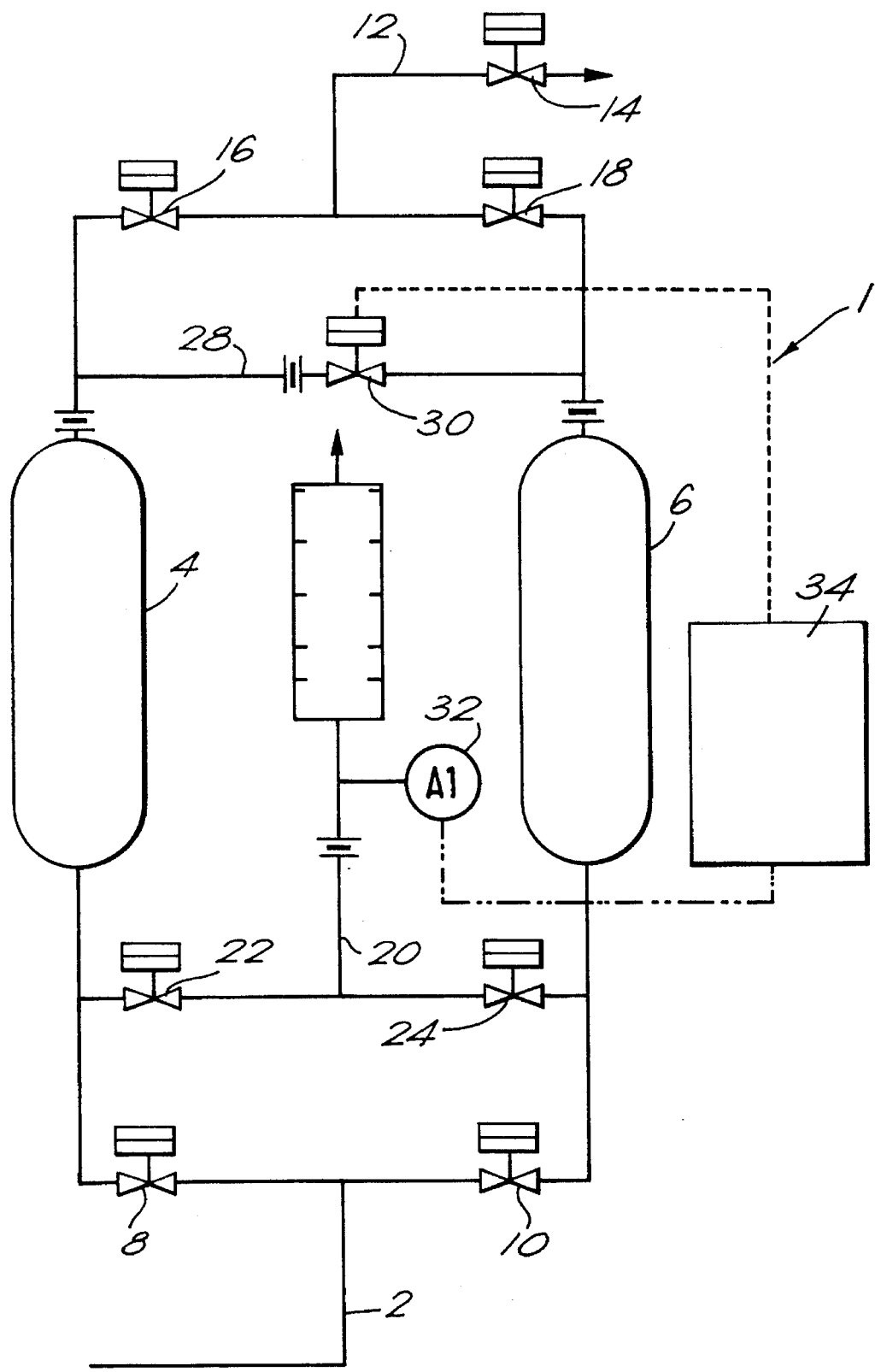

As shown, a PSA plant 1 for the production of oxygen from air includes an air feed line 2 from a compressor (not shown). The air feed line 2 is able to be placed in communication with either one of vessels 4, 6 containing beds of a zeolite molecular sieve adsorbent. A valve 8 is operable to place the bottom of vessel 4 in communication with the air feed line 2 or deny such communication. Likewise, a valve 10 is operable to place the bottom of vessel 6 in communication with the air feed line 2 or deny such communication.

The plant 1 includes an outlet pipe 12 for oxygen rich product gas in which is located a valve 14. Valves 16, 18 are operable to place the top of the vessels 4 and 6 respectively in communication with or to deny communication with the pipeline 12. The pipeline 12 extends towards an oxygen receiver vessel (not shown). Plant 1 also includes an outlet pipeline 20 for waste and purge gases. A valve 22 is operable to place the bottom of the vessel 4 in communication with the pipeline 20 or deny such communication. Likewise, a valve 24 is operable to place the bottom of the bed 6 in communication with the pipeline 20 or to deny such communication. A pipeline 28 connects together the upper ends of the vessels 4, 6 and a valve 30 controls the flow of gas between said vessels 4, 6 through the pipeline 28.

Located in the pipeline 20 is a fast response analyzer sensing head, for example, a fuel cell, for sensing the percentage by volume of oxygen flowing through the pipeline 20. The fuel cell 32 is located such that in operation it can analyze the gas flowing through the pipeline 20 and generate a signal which is transmitted to a control unit 34. The control unit 34 is linked to the valve 30 to permit or prevent the flow of purge gas through the pipeline 28 as will be explained.

In use, at the start of an operating cycle the interior of the vessel 4 is exposed to feed air under pressure which flows from the compressor (not shown) through the pipeline 2 open valve 8 and into the bottom of the pressure vessel 4. Nitrogen is adsorbed by the zeolite bed and a product gas rich in oxygen leaves the vessel 4 through the valve 16 and into the pipeline 12; through the valve 14 and into, for example, an oxygen receiver vessel (not shown).

Whilst the zeolite in vessel 4 is on an adsorption step the zeolite in vessel 6 is undergoing a desorption step in which the bottom of the vessel 6 is in communication with atmosphere via open valve 24 and pipeline 20. Thus, residual unadsorbed gas is vented and adsorbed gas, mainly nitrogen, is desorbed and also vented.

During this step a continuous controlled purge flows through valve 30 such that oxygen rich product gas flows from vessel 4, through line 28 and open valve 30 and hence into the upper end of vessel 6. The purging gas will flow down through the vessel 6, through open valve 24 and into line 20 and hence to atmosphere. The oxygen purge flow displaces nitrogen in the desorbing bed within the vessel 6. The purge step will continue until the fuel cell 32 senses that the percentage by volume of oxygen in the purge gas flowing through the line 20 has reached a preselected level. Once that level is reached the fuel cell 32 will transmit a signal to the controller 34 which will automatically close the valve 30 and interrupt the flow of purge gas through the line 28.

After the production/purge step the zeolite in the vessels 4, 6 will undergo an equalization step where oxygen rich air will transfer from the higher pressure bed 4 via valves 16, 18 to bed 6. Then the zeolite will reverse roles such that the feed air under pressure will then pass through the feed air line 2 and be directed through open valve 10 and into the bottom of the vessel 6. An oxygen rich product gas leaves the vessel 6 via open valve 18 and passes along the pipeline 12 and open valve 14 towards the oxygen receiver vessel.

During the adsorption step of the zeolite in the vessel 6, the zeolite in vessel 4 will be desorbed by opening valve 22 such that unadsorbed oxygen and adsorbed nitrogen leaves the bottom of the vessel 4 via open valve 22 and line 20 and a continuous controlled purge will flow from vessel 6 through line 28 and open valve 30 and hence into the upper end of vessel 4. The purging gas will flow down through the vessel 6, through open valve 22 into line 20 and hence to atmosphere.

As previously explained the oxygen purge flow displaces nitrogen in the desorbing bed within the vessel 4. The purging step will continue until the fuel cell 32 senses that the percentage by volume of oxygen in the purge gas flowing through line 20 has reached a preselected level and once that level is reached it will transmit a signal to the controller 34 thereby to close valve 30. After this purge step the pressure in the vessels 4, 6 will again be equalized by opening valves 16, 18 such that higher pressure gas in vessel 6 flows into the top of vessel 4.

It will be evident in the embodiment described above that the use of an analyzer sensing head to signal when the purge gas flowing through pipeline 20 has reached a preselected level prevents any excess waste of oxygen rich purge gas. Furthermore, the time consuming and difficult operation of trying to balance each bed of adsorbent is obviated.

The system has also been found to be of great advantage in power saving when turndown/load following is used (reduction in product take off which then requires less purge gas hence less power).

Although reference has been made to a PSA plant in which waste and purge gases are vented to atmosphere a vacuum pump can be placed in communication with pipeline 20 in a manner known per se.

From the forgoing, it will be appreciated that, although specific embodiments of the invention have been described herein for purposes of illustration, various modifications may be made without deviating from the spirit and scope of the invention. Accordingly, the invention is not to be limited except as by the appended claims.

We claim:

1. A pressure swing adsorption method of producing a product gas from a feed gas mixture including the product gas comprising repeatedly performing a cycle of operations which includes the steps of:

a) contacting the feed gas mixture with a bed of adsorbent material which adsorbs preferentially at least one other component of the feed gas mixture relative to the product gas. thereby producing said product gas as nonadsorbed component;

b) desorbing the bed;

c) purging the bed with said product gas;

d) sensing when the gas leaving the bed during the purging step contains a preselected volume of said product gas; and e) on reaching the preselected volume stopping the purge step.

2. A method as claimed in claim 1, in which there are a plurality of such beds of adsorbent material each operating on a similar cycle but sequenced to be out-of-phase with one another such that a substantially continuous supply of product gas is produced.

3. A method as claimed in claim 1 or 2, in which the feed gas mixture is air and the product gas is oxygen.

\* \* \* \* \*